UNITED STATES PATENT OFFICE.

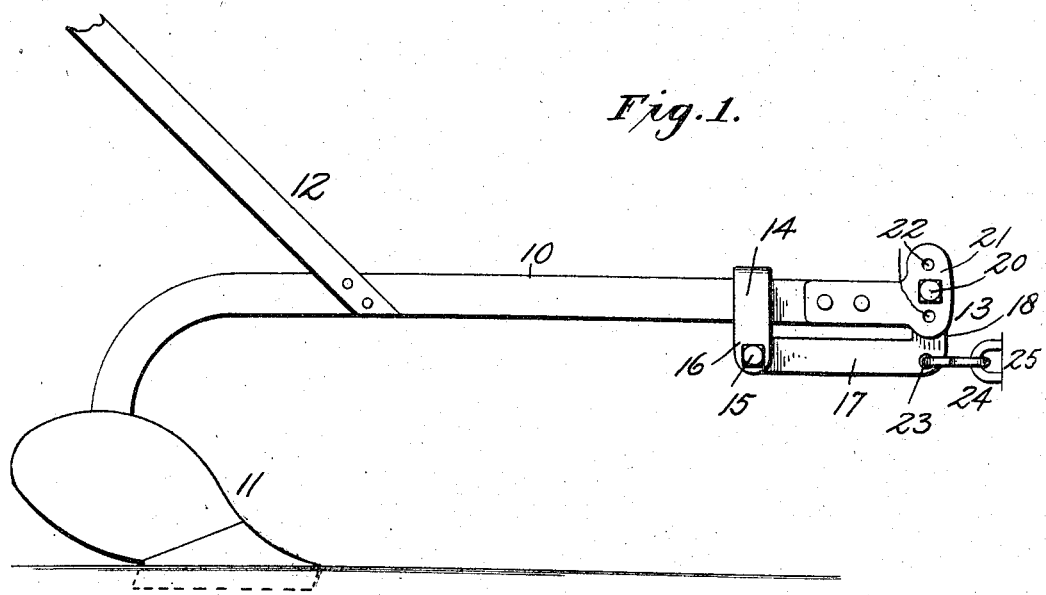
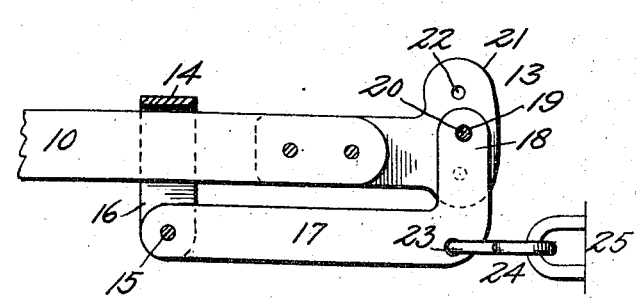
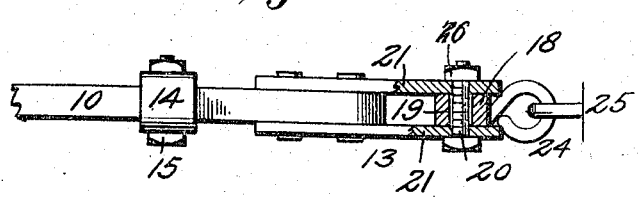

LEMON W. HAMILTON, OF ROSS, TEXAS.

PLOW ATTACHMENT.

1,204,566.  Specification of Letters Patent.  Patented Nov. 14, 1916.

Application filed August 21, 1916. Serial No. 116,166.

*To all whom it may concern:*

Be it known that I, LEMON W. HAMILTON, a citizen of the United States, residing at Ross, in the county of McLennan and State of Texas, have invented certain new and useful Improvements in Plow Attachments, of which the following is a specification.

This invention relates to a plow attachment for a clevis and is designed to be used in connection with the draft devices, and has for its object to provide adjustable means on the forward end of a plow beam for regulating the depth of a plow share in the ground.

This attachment is simple and quickly adjusted to prevent the plow running too deep and may be applied to any of the plows now in the market particularly such plows as have steel beams.

With this as the principal object in view, the invention consists of the novel construction of parts hereinafter described, pointed out in the claims and illustrated in the accompanying drawings in which:

Figure 1 is a side elevation of a plow provided with the improved attachment. Fig. 2 is a similar view of the forward end of the plow beam and attachment partly in section. Fig. 3 is a plan view of so much of the plow as is shown in Fig. 2 partly broken away.

In the drawing, 10 indicates the plow beam, on the rear end of which is mounted the plow share 11 and handles 12, while on the forward end is the usual clevis 13, these features being common to substantially all the plows now in use.

Secured to the beam 10 a short distance in rear of the clevis 13 is a U-shaped clip 14 that straddles the beam 10 with its open end downward and is clamped thereon by means of a bolt 15 extending through the lower ends of the clip. Between the ends 16 of the clip 14 is pivoted one end of an arm 17 that extends forwardly beneath the beam 10 to the front end of the clevis 13 and then turns upwardly, the upturned end 18 having a perforation 19 formed transversely therethrough for a securing bolt 20 that projects through the two plates 21 of the clevis 13. The two clevis plates 21 as shown lie on opposite sides of the forward end of the plow beam 10 and are thus separated by a space equal to the thickness of said plow beam into which space the upturned end 18 of the arm 17 enters. As usual the clevis 13 is provided with a series of perforations 22 arranged in a substantially vertical line and through any one of these perforations and the perforation 19 the bolt 20 may be passed to secure the arms 17 in any position desired for the purpose of regulating the depth which the plow enters the earth.

Through the forward end of the arm 17 just as it turns to form the upstanding portion 18 is a perforation 23 to which is connected the shackle 24 of the swingletree 25. Draft being applied to the arm 17, its action of the plow will vary as the angle of said arm is changed by varying the position of the bolt 20 in one or the other of the clevis perforations 22, it being only necessary to remove the nut 26 from the bolt 20 and withdraw said bolt thereupon the arm 17 may be raised or lowered to the desired position and secured by replacing the bolt through one or the other of said perforations and the perforation 19 in the arm 17.

What I claim is:—

1. A plow attachment for adjusting the draft applied thereto comprising a clip secured to the beam of the plow, an L-shaped arm pivoted to said clip below the beam, means for securing draft devices to said arm, and means for securing said arm to the plow clevis at different vertical angles.

2. A plow attachment comprising a downwardly opening clip secured to the plow beam in rear of the clevis, an L-shaped arm pivoted at one end in the open end of said clip and adapted to swing in a vertical plane, means for securing draft devices to said arm, and fastening means adapted to engage the plow clevis and the opposite end of said arm, said means being adjustable.

3. An attachment for plows comprising a U-shaped clip adapted to be secured to the plow beam, an L-shaped arm pivoted at one end within the open end of said clip and having a perforation extending transversely through the extremity, and means at the angle of said arm for the attachment of draft devices.

In testimony whereof I affix my signature in presence of two witnesses.

LEMON W. HAMILTON.

Witnesses:
C. T. DUPREE,
L. R. HOPKINS.

Copies of this patent may be obtained for five cents each, by addressing the "Commissioner of Patents, Washington, D. C."